United States Patent
Ficker et al.

(10) Patent No.: US 9,739,406 B2
(45) Date of Patent: Aug. 22, 2017

(54) SYSTEMS AND METHODS FOR COUPLING PIPE WITH ANGLED COUPLING MECHANISM

(75) Inventors: James Joseph Ficker, Vancouver, WA (US); Bill Russell Vanhoose, Findlay, OH (US); Owen Michael Atchison, Findlay, OH (US); Nicholas James Piazza, Findlay, OH (US); Jeffrey Alan Warden, Lafayette, OR (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 367 days.

(21) Appl. No.: 13/554,337

(22) Filed: Jul. 20, 2012

(65) Prior Publication Data

US 2013/0134705 A1    May 30, 2013

Related U.S. Application Data

(60) Provisional application No. 61/510,950, filed on Jul. 22, 2011.

(51) Int. Cl.
*F16L 41/00* (2006.01)

(52) U.S. Cl.
CPC ............. *F16L 41/004* (2013.01); *F16L 41/00* (2013.01)

(58) Field of Classification Search
CPC ............................. F16L 41/004; F16L 41/00
USPC ................ 285/201–204, 131.1, 132.1, 140.1
See application file for complete search history.

(56) References Cited

U.S. PATENT DOCUMENTS

| | | | |
|---|---|---|---|
| 562,067 A * | 6/1896 | Copeland | 285/205 |
| 1,863,439 A | 10/1932 | Adams | |
| 2,101,311 A | 12/1937 | Duncan | |
| 3,997,195 A | 12/1976 | Bartholomew | |
| 4,365,829 A * | 12/1982 | Fowler | 285/140.1 |
| 4,438,955 A | 3/1984 | Ryan | |
| 4,450,613 A | 5/1984 | Ryan et al. | |
| 4,543,990 A * | 10/1985 | Meuleman | 137/556 |
| 4,718,700 A * | 1/1988 | Horch | F16L 31/02 285/133.5 |
| 5,029,879 A * | 7/1991 | Strang et al. | 277/606 |
| 5,056,704 A * | 10/1991 | Martin et al. | 228/173.4 |
| 5,145,216 A | 9/1992 | Valls, Jr. | |
| D330,073 S | 10/1992 | Valls | |

(Continued)

FOREIGN PATENT DOCUMENTS

| | | | | |
|---|---|---|---|---|
| CH | 557981 A * | 1/1975 | | |
| DE | 2134169 A1 * | 1/1973 | | F16L 41/004 |
| NL | 1004099 C2 * | 3/1998 | | F16L 41/004 |

*Primary Examiner* — David E Bochna
*Assistant Examiner* — James A Linford
(74) *Attorney, Agent, or Firm* — Finnegan, Henderson, Farabow, Garrett & Dunner LLP

(57) ABSTRACT

Embodiments of the present disclosure include a coupling mechanism. The coupling mechanism may include a connection section including a first opening, an inner flange, and an outer flange, wherein the connection section is configured to connect to a first pipe, a sleeve portion including a second opening and configured to connect to a second pipe, and a channel extending through the coupling mechanism between the first opening and the second opening, wherein the first opening is angled relative to the second opening, wherein the inner flange includes a first end and a second end, wherein the first end of the inner flange includes a width larger than a width of the second end of the inner flange.

15 Claims, 5 Drawing Sheets

(56) References Cited

U.S. PATENT DOCUMENTS

| | | |
|---|---|---|
| 5,169,161 A | 12/1992 | Jones |
| 5,211,695 A * | 5/1993 | Dowler ...................... 285/140.1 |
| 5,326,139 A | 7/1994 | Corcoran |
| 5,340,160 A | 8/1994 | Meijers et al. |
| 5,951,062 A | 9/1999 | Miller |
| 6,089,615 A | 7/2000 | Jappinen |
| 6,113,156 A | 9/2000 | Bea |
| 6,508,490 B1 | 1/2003 | Hoffman |
| D475,449 S | 6/2003 | Stout, Jr. |
| D476,074 S | 6/2003 | Stout, Jr. |
| 6,623,045 B2 | 9/2003 | Wurgler |
| 7,988,203 B2 | 8/2011 | Martin |
| 8,196,968 B2 | 6/2012 | Kief et al. |
| 2008/0001394 A1 | 1/2008 | Ziu |
| 2009/0145488 A1* | 6/2009 | Hoskisson et al. ........... 137/318 |
| 2010/0187813 A1 | 7/2010 | Anders |

* cited by examiner

US 9,739,406 B2

SYSTEMS AND METHODS FOR COUPLING PIPE WITH ANGLED COUPLING MECHANISM

CROSS-REFERENCE TO RELATED APPLICATION

This application claims the benefit of priority under 35 U.S.C. §119 to U.S. Provisional Patent Application No. 61/510,950, filed on Jul. 22, 2011, which is incorporated herein by reference in its entirety.

FIELD OF THE DISCLOSURE

Embodiments of the present disclosure include coupling mechanisms for connecting together a plurality of pipes, and more particularly, coupling mechanisms for connecting pipes together in an angled configuration.

BACKGROUND OF THE DISCLOSURE

Generally, pipe or tubing systems may be employed for a number of domestic, agricultural, and industrial drainage applications. The pipe system may include a mainline pipe into which one or more lateral pipes may be connected.

The lateral pipes may be coupled to the mainline pipe by drilling a hole though the mainline pipe and connecting an adapter to the hole. The lateral pipe may then be connected to the adapter. One such conventional adapter may provide a "Y-shaped" or 45° connection between the mainline pipe and the lateral pipe. To secure the adapter to the mainline pipe, straps, clamps, or other fasteners must be wrapped around the adapter and the mainline pipe. Connecting such conventional adapters to a mainline pipe, however, is cumbersome and time consuming, especially if an underground mainline pipe must be dug up to wrap a strap around the pipe.

Accordingly, the coupling mechanism of the present disclosure is directed to improvements in the existing technology.

SUMMARY OF THE DISCLOSURE

In accordance with an embodiment, a coupling mechanism is disclosed for connecting together a plurality of pipes may include a connection section including a first opening, an inner flange, and an outer flange, wherein the connection section is configured to connect to a first pipe, a sleeve portion including a second opening and configured to connect to a second pipe, and a channel extending through the coupling mechanism between the first opening and the second opening, wherein the first opening is angled relative to the second opening, wherein the inner flange includes a first end and a second end, wherein the first end of the inner flange includes a width larger than a width of the second end of the inner flange.

In accordance with another embodiment, a coupling mechanism is disclosed for connecting together a plurality of pipes may include a connection section including a first opening, an inner flange, and an outer flange, wherein the connection section is configured to connect to a first pipe, a sleeve portion including a second opening and configured to connect to a second pipe, wherein the inner flange and the outer flange of the connection section extend from the sleeve portion at an angle, a channel extending through the coupling mechanism between the first opening and the second opening, and one or more ribs extending between the outer flange and the sleeve portion.

In accordance with yet another embodiment, a coupling mechanism for connecting together a plurality of pipes may include a connection section including a first opening, an inner flange, and an outer flange, wherein the connection section is configured to connect to a first pipe, a sleeve portion including a second opening and configured to connect to a second pipe, and a channel extending through the coupling mechanism between the first opening and the second opening, wherein the first opening is angled relative to the second opening, wherein the outer flange includes a first end, a second end, and side sections extending between the first end of the outer flange and the second end of the outer flange, wherein the first end the outer flange includes a width larger than a width of each of the side sections.

DETAILED DESCRIPTION

Reference will now be made in detail to exemplary embodiments of the present disclosure described above and illustrated in the accompanying drawings. Wherever possible, the same reference numbers will be used throughout the drawings to refer to the same or like parts.

Figure 1:
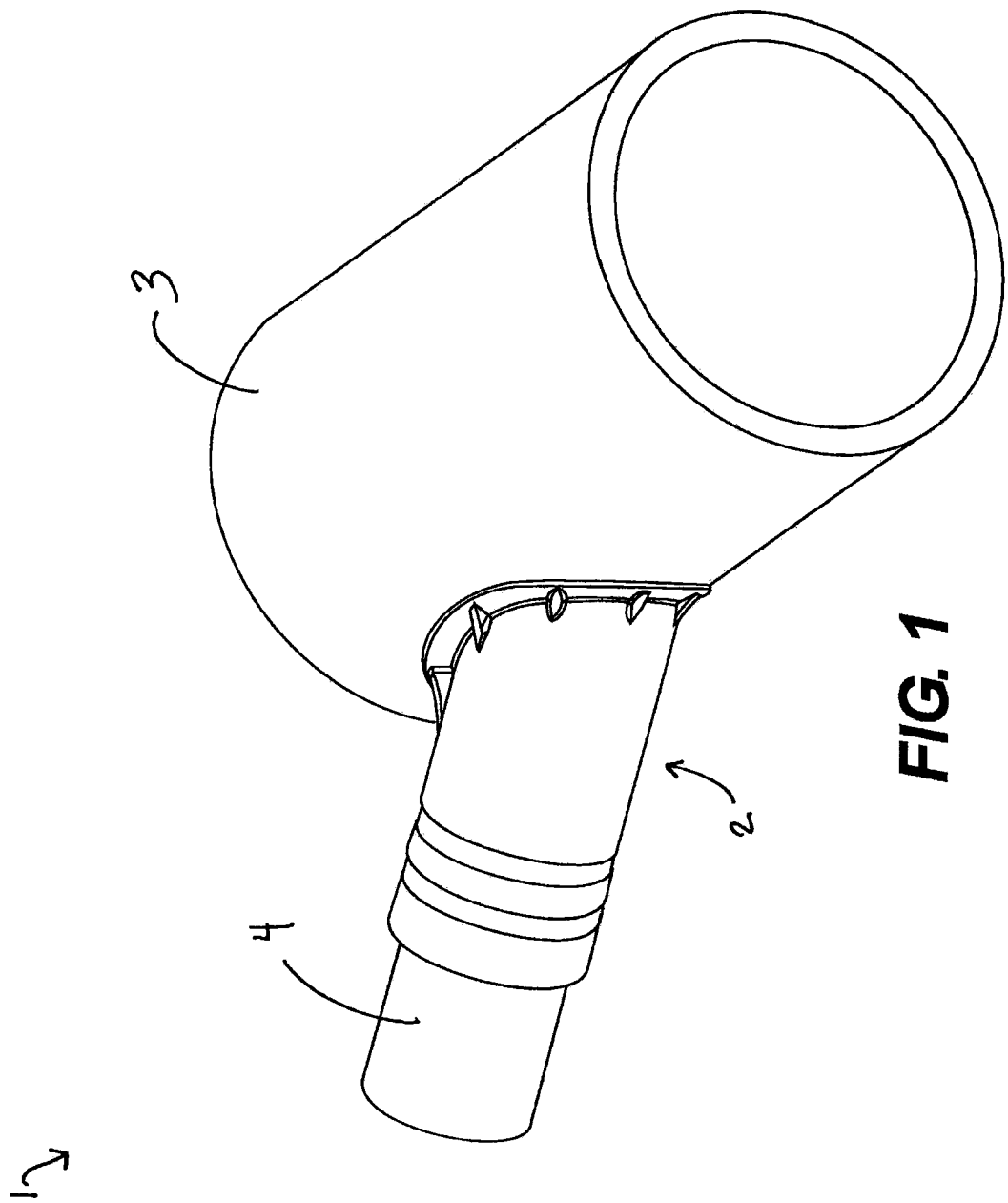
FIG. 1 is a perspective illustration of a pipe system, according to an exemplary disclosed embodiment.

FIG. 1 illustrates a perspective view of an exemplary pipe system 1 of the present disclosure. Pipe system 1 may be configured to collect, transport, and drain a fluid to an appropriate location. In one embodiment, pipe system 1 may be a subterranean drainage system disposed below a surface of a ground, such as a road, sidewalk, or lot, and may be employed to drain excess rainwater or groundwater from the ground to an appropriate discharge point, such as a canal, river, lake, ocean, or treatment facility (not shown). It should be appreciated, however, that the details of the disclosed pipe system will be applicable in various other drainage settings. For example, pipe system 1 may be utilized in mining, agriculture, sewage disposal, a storm sewer, a turf or recreational field, the timber industry, landfill and waste disposal, road and highway drainage, and residential and commercial drainage applications for transporting and draining various types of fluid.

Pipe system 1 may include one or more pipes coupled together by a coupling mechanism 2. In the exemplary embodiment of FIG. 1, coupling mechanism 2 may be configured to fluidly connect together a first pipe 3 and a second pipe 4. It should be appreciated, however, that pipe system 1 may include any number of pipes connected together by one or more coupling mechanisms 2. Accordingly, fluid, such as, for example, rain water, may be transported from one of first pipe 3 and second pipe 4, through coupling mechanism 2, and to the other of first pipe 3 and second pipe 4. Discharged fluid then may be transported and drained to an appropriate discharge point. Although second pipe 4 is shown as having a smaller diameter than the diameter of first pipe 3, it will be appreciated that second pipe 4 may have the same diameter as first pipe 3 or a larger diameter than the diameter of first pipe 3.

In one embodiment, pipes 3, 4 may be corrugated, high density polyethylene pipes (HDPE). In other embodiments, pipes 3, 4 may have smooth outer surfaces or ribbed outer surfaces, and may be formed from any other appropriate material, such as, for example, rubber, rubber composites, polyvinylchloride (PVC), polypropylene (PP), or any other suitable rubber and/or polymer composite.

Coupling mechanism 2 may comprise a substantially hollow structure configured to connect together pipes 3, 4. More particularly, and as will be described in more detail below, coupling mechanism 2 may provide a lateral connection of second pipe 4 onto first pipe 3. Furthermore, coupling mechanism 2 may be configured to form an angled connection between first and second pipes 3, 4. As such, pipe system 1 may include a "Y-shaped" configuration formed by first pipe 3, second pipe 4, and coupling mechanism 2. In certain embodiments, the angle between first and second pipes 3, 4 may be approximately 45° (i.e., the axial centerlines of the first and second pipes 3, 4 may form a 45° angle where they intersect each other). It should be appreciated, however, that coupling mechanism 2 may connect together first pipe 3 and second pipe 4 at any suitable angle ranging between 0° and 89°.

Figure 2:
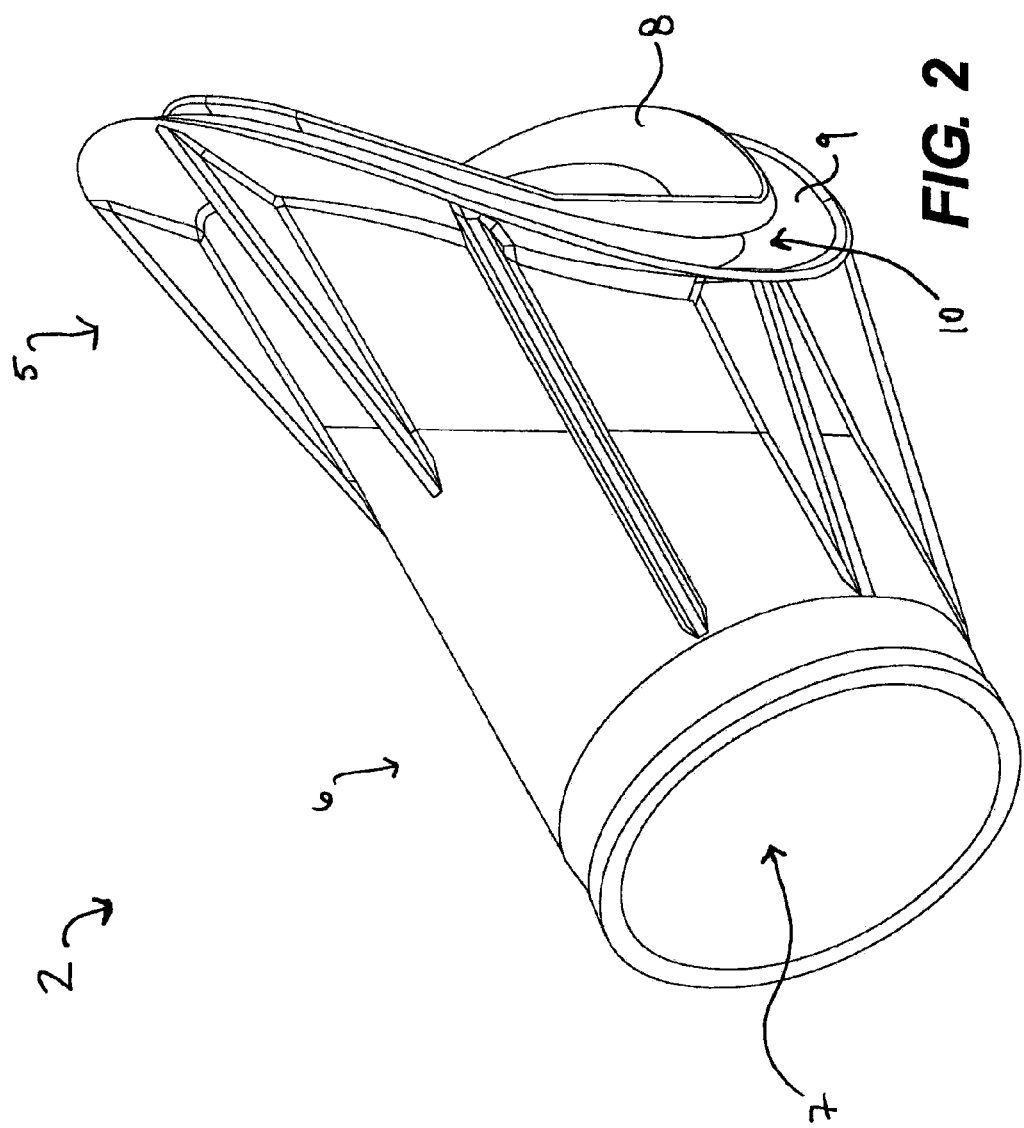
FIG. 2 illustrates a perspective view of a coupling mechanism, according to an exemplary disclosed embodiment.

FIG. 2 illustrates a perspective view of coupling mechanism 2, according to an exemplary disclosed embodiment. Coupling mechanism 2 may be formed of any suitable elastomeric material, such as, for example, rubber, polymers, and the like. Moreover, coupling mechanism 2 may include a connection section 5, a sleeve portion 6, and a channel 7 extending through connection section 5 and sleeve portion 6. Connection section 5 may be configured to fluidly connect to first pipe 3, and sleeve portion 6 may be configured to fluidly connect to second pipe 4.

Connection section 5 may include an inner flange 8 and an outer flange 9, and inner flange 8 and outer flange 9 may extend from sleeve portion 6 at a desired angle. In one embodiment, one or both of the inner and outer flanges 8, 9 may be formed from another molded part and affixed to connection section 5. A recessed section 10 may be defined between inner flange 8 and outer flange 9. As will be described in more detail below, a hole 20 (FIG. 5) may be formed in a side surface of first pipe 3, and inner flange 8 may be inserted into hole 20 such that a wall 21 of first pipe 3 defining hole 20 may be securely positioned within recessed section 10. In one embodiment, one or more of the inner flange 8, outer flange 9, and sleeve portion 6 may have embedded therein one or more stiffening portions. For example, stiffening portions may be formed from hard plastic, aluminum, steel or some other hard material, e.g., in the form of a ring or plate, and embedded in or affixed to one or more of inner flange 8, outer flange 9, and sleeve portion 6.

As shown in FIG. 2, outer flange 9 may include a suitable shape to complement the outer surface of first pipe 3. Similarly, inner flange 8 may include a suitable shape to complement the inner surface of first pipe 3. For example, outer flange 9 may include a substantially sinusoidal shape to conform to the curvature of the outer surface of first pipe 3, and inner flange 8 may include a substantially sinusoidal shape to conform to the curvature of the inner surface of first pipe 3. By having outer flange 9 and inner flange 8 conform to the curvature of the outer and inner surfaces of first pipe 3, connection section 5 may provide a tighter fluidic seal between coupling mechanism 2 and first pipe 3. In one embodiment, the shapes of inner and outer flanges 8, 9 may match or approximate a shape of a saddle, or hyperbolic parabaloid.

Figure 3:
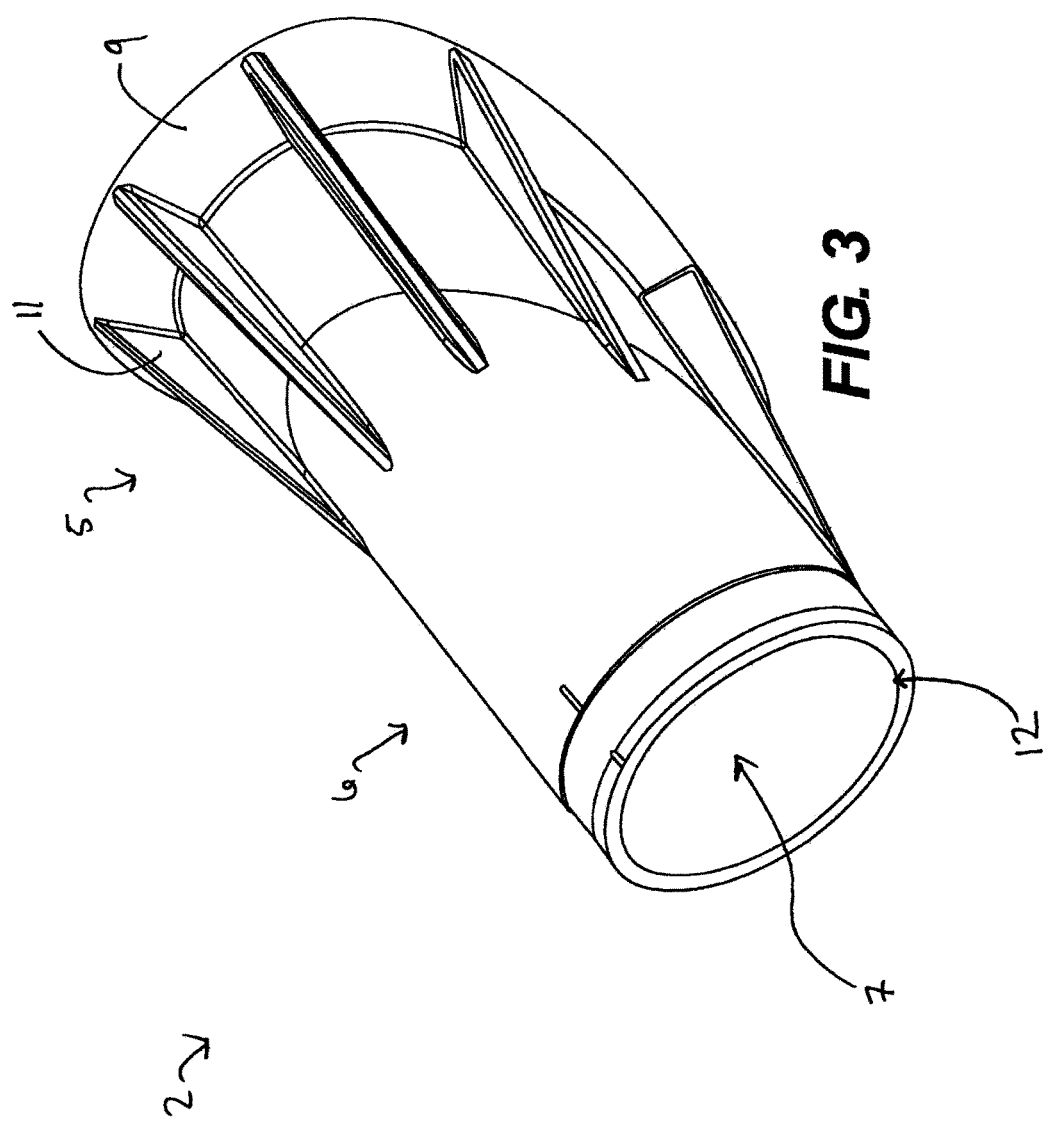
FIG. 3 illustrates another perspective view of a coupling mechanism, according to an exemplary disclosed embodiment.

FIG. 3 illustrates another perspective view of coupling mechanism 2, according to an exemplary disclosed embodiment. Coupling mechanism 2 may also include one or more ribs 11 extending between outer flange 9 and sleeve portion 6. In certain embodiments, ribs 11 may be positioned around an outer circumference of sleeve portion 6. Ribs 11 may be configured to provide structural support to coupling mechanism 2. For example, ribs 11 may support connection section 5 and sleeve portion 6 against load and pressure applied to connection section 5 and sleeve portion 6 when connecting coupling mechanism 2 to first pipe 3 and/or when inserting second pipe 4 into sleeve portion 6. Moreover, ribs 11 may maintain the angle from which second pipe 4 extends from first pipe 3. That is, ribs 11 may prevent bending of sleeve portion 6 relative to connection section 5 when first and second pipes 3, 4 are fluidly coupled to coupling mechanism 2.

As shown in FIG. 3, sleeve portion 6 may include a sleeve opening 12 in communication with channel 7. Second pipe 4 may be inserted into sleeve opening 12 and disposed in channel 7 to be fluidly coupled to first pipe 3. In certain embodiments, sleeve opening 12 and channel 7 may each include an inner diameter smaller than an outer diameter of second pipe 4. As such, second pipe 4 may form a fluid-tight friction fit with sleeve portion 6 when connected to coupling mechanism 2. It should also be appreciated that one or more tightening mechanisms, such as, for example, any suitable bands, rings, belts, and the like, may be secured around the outer surface of sleeve portion 6 and tightened to improve the connection between second pipe 4 and coupling mechanism 2.

Figure 4:
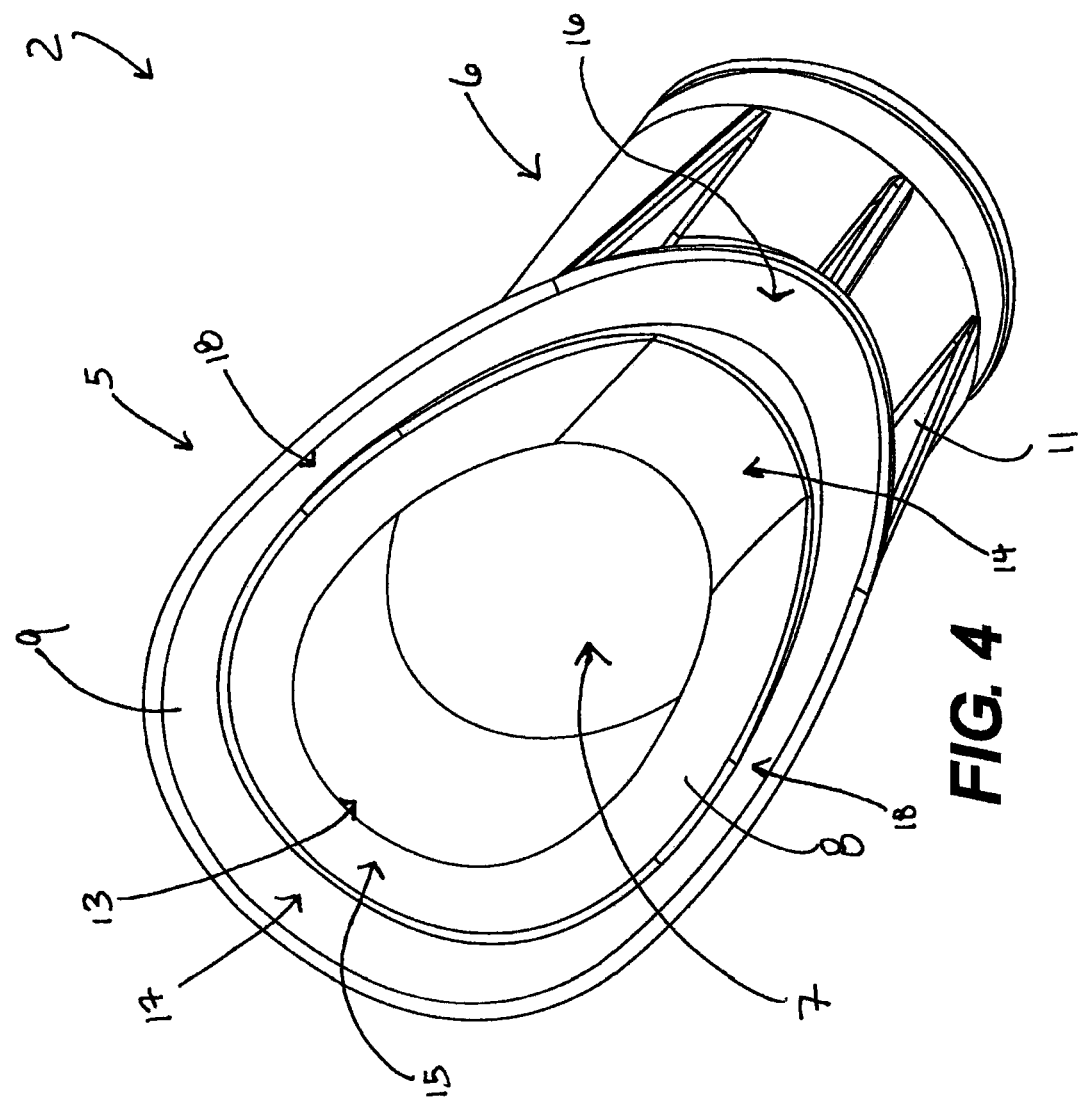
FIG. 4 illustrates another perspective view of a coupling mechanism, according to an exemplary disclosed embodiment.

FIG. 4 illustrates another perspective view of coupling mechanism 2, according to an exemplary disclosed embodiment. As shown in FIG. 4, connection section 5 may include an opening 13 in communication with channel 7, and inner flange 8 may surround an outer periphery of opening 13. Outer flange 9 may surround an outer periphery of inner flange 8 as separated by recessed section 10. Inner flange 8 may also include a first end 14 including a width larger than a width of a second end 15 opposite first end 14. In other words, inner flange 8 radially extends a greater distance from sleeve portion 6 at first end 14 than at second end 15. The wider first end 14 and shorter second end 15 may allow eased insertion of connection section 5 into hole 20 of first pipe 3, while providing sufficient surface area to form a fluid-tight seal.

Outer flange 9 may also include a first end 16 proximate first end 14 of inner flange 8, a second end 17 proximate second end 15 of inner flange 8, and side sections 18 between first end 16 and second end 17. As shown in FIG. 4, first end 16 and second end 17 of outer flange 9 may each include a width larger than a width of each side section 18. First and second ends 16, 17 may be wider than side sections 18 to accommodate and support coupling mechanism 2 as coupling mechanism 2 extends from first pipe 3 at an angled configuration.

Figure 5:
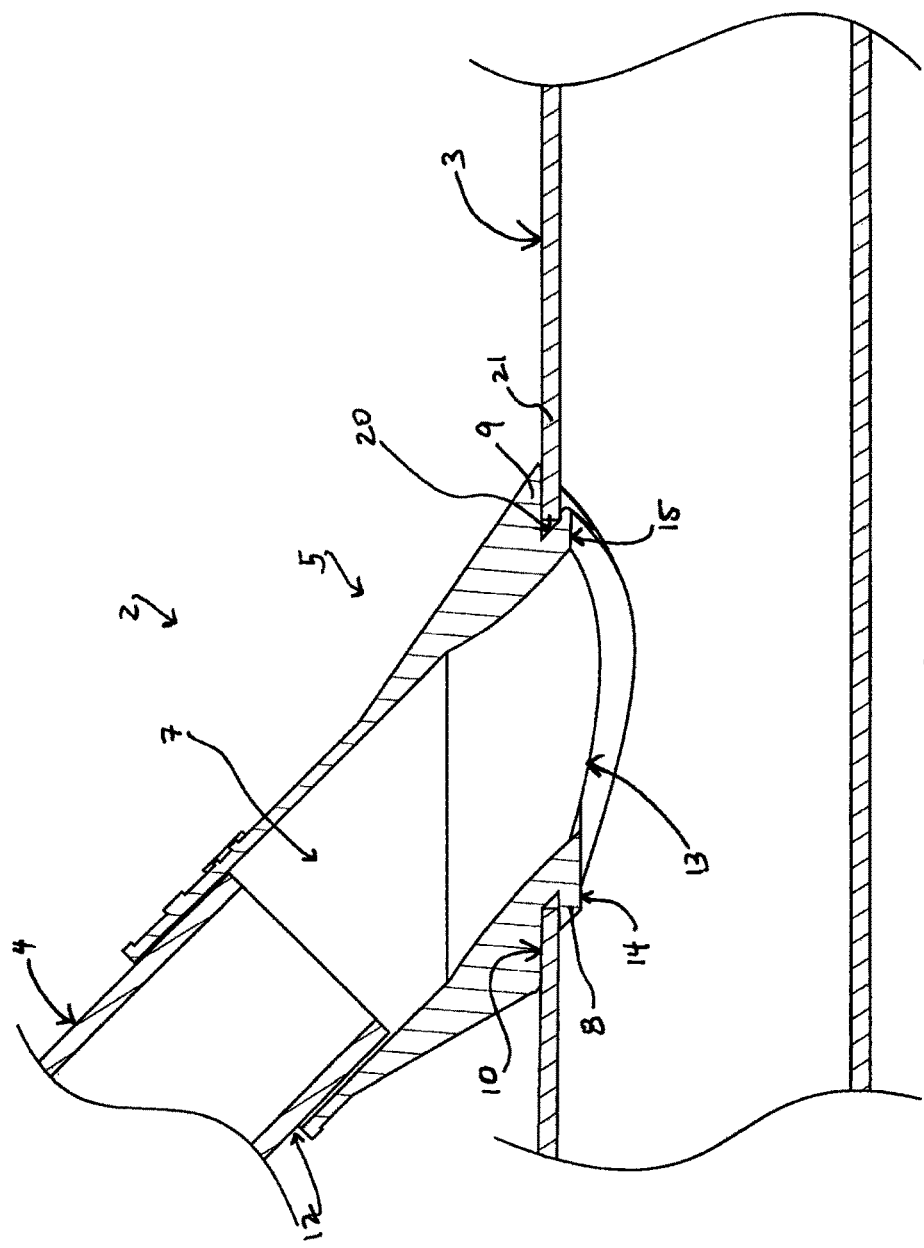
FIG. 5 illustrates a cross-sectional view of a first pipe and a second pipe coupled together via a coupling mechanism, according to an exemplary disclosed embodiment.

FIG. 5 illustrates a cross-sectional view of first pipe 3 and second pipe 4 coupled together via coupling mechanism 2, according to an exemplary disclosed embodiment. As shown in FIG. 5, opening 13 may be angled relative to sleeve opening 12 so that coupling mechanism 2 may extend at an angle relative to first pipe 3.

Coupling mechanism 2 may be connected to first pipe 3 by inserting first end 14 of inner flange 8 into hole 20 such that a portion of wall 21 of first pipe 3 enters recessed section 10. Second end 15 of inner flange 8 may then be inserted into hole 20 such that the remaining portions of wall 21 defining hole 20 enter recessed section 10. It should be appreciated that recessed section 10 may include a width smaller than a thickness of wall 21 such that a fluidly-tight friction fit may be formed between wall 21 and inner and outer flanges 8, 9. Moreover, because first end 14 of inner flange 8 may be wider than second end 15 of inner flange 8, connection section 5 may allow for an eased snap-fit installation. As shown in FIG. 5, inner flange 8 may abut against an inner surface of wall 21, and therefore, may prevent accidental dislodging of coupling mechanism 2 from first pipe 3. Moreover, outer flange 9 may abut against an outer surface of wall 21 and may cover an outer periphery of hole 20. Accordingly, outer flange 9 may block and prevent any undesired leakage from first pipe 3 through hole 20.

First end 14 of inner flange 8 may also include a thickness larger than a thickness of second end 15 of inner flange 8. By varying the thickness of inner flange 8, the angular integrity of coupling mechanism 2 as coupling mechanism 2 extends from first pipe 3 may be maintained. In addition, the thinner second end 15 may ease installation of coupling mechanism 2 as connection section 5 is inserted into hole 20, and may ease disassembly of coupling mechanism 2 as connection section 5 is removed from hole 20.

As stated above, second pipe 4 may be installed onto coupling mechanism 2, and thus fluidly coupled to first pipe 3, by inserting an end of second pipe 4 through sleeve opening 12 and into channel 7. A fluid-tight friction fit may be formed between second pipe 4 and sleeve portion 6.

Although not illustrated, it should also be appreciated that coupling mechanism 2 may include a suitable marker to indicate that second pipe 4 is properly aligned with coupling mechanism 2 and first pipe 3.

Any aspect set forth in any embodiment may be used with any other embodiment set forth herein. It will be apparent to those skilled in the art that various modifications and variations can be made in the disclosed devices and processes without departing from the scope of the disclosure. Other embodiments of the disclosure will be apparent to those skilled in the art from consideration of the specification and practice of the disclosure disclosed herein. It is intended that the specification and examples be considered as exemplary only.

What is claimed is:

1. A coupling mechanism for connecting together a plurality of pipes, the coupling mechanism comprising:
   a connection section including a first opening, an inner flange, and an outer flange, wherein a recessed section is defined between the inner flange and the outer flange and surrounds the entire first opening, wherein the connection section is configured to connect to a first pipe;
   a sleeve portion including a second opening and configured to connect to a second pipe;
   a channel extending through the coupling mechanism between the first opening and the second opening, wherein the first opening is angled relative to the second opening,
   wherein the outer flange has a substantially continuous innermost surface for mating with an exterior surface of the first pipe and the inner flange has a substantially continuous outermost surface for mating with an interior surface of the first pipe;
   wherein the recessed section is angularly tapered from the inner flange to the outer flange with respect to the innermost surface and outermost surface;
   wherein the outer flange has an outermost circumferential edge having a diameter that changes along the circumference of the outermost circumferential edge, wherein the outermost circumferential edge has a first section positioned opposite a second section and a third section positioned opposite a fourth section, the third and fourth sections positioned transverse to the first and second sections and connecting the first and second sections, wherein the first section has a radius larger than a radius of the second section, and the third and fourth sections have substantially the same radii, and the third and fourth sections have different radii than the first and second sections;
   wherein the inner flange has an outermost circumferential edge having a diameter that changes along the circumference of the outermost circumferential edge, wherein the entire diameter of the outermost circumferential edge of the inner flange is smaller than the entire diameter of the outermost circumferential edge of the outer flange;
   wherein the outermost circumferential edge of the inner flange has a first section positioned opposite a second section and a third section positioned opposite a fourth section, the third and fourth sections positioned transverse to the first and second sections and connecting the first and second sections, wherein the first section has a radius larger than a radius of the second section, and the third and fourth sections have substantially the same radii, and the third and fourth sections have different radii than the first and second sections;
   wherein the first section of the inner flange includes a thickness larger than a thickness of the second section of the inner flange; and
   wherein the thickness is measured transverse to the radius.

2. The coupling mechanism of claim 1, wherein the inner flange and the outer flange are configured to secure a wall of the first pipe within the recessed section.

3. The coupling mechanism of claim 1, wherein the inner flange surrounds an outer periphery of the first opening.

4. The coupling mechanism of claim 3, wherein the outer flange surrounds an outer periphery of the inner flange.

5. The coupling mechanism of claim 1, wherein the coupling mechanism is configured to couple the second pipe to the first pipe such that the second pipe extends from the first pipe at an angle.

6. The coupling mechanism of claim 1, wherein the coupling mechanism is configured to couple the second pipe to the first pipe such that the second pipe extends from the first pipe at an angle between 0° and 89°.

7. The coupling mechanism of claim 1, wherein the channel is configured to receive the second pipe, and the sleeve portion is configured to form a friction fit with the second pipe.

8. The coupling mechanism of claim 1, wherein the inner flange and the outer flange of the connection section extend from the sleeve portion at an angle.

9. The coupling mechanism of claim 1, further comprising one or more ribs extending between the outer flange and the sleeve portion.

10. The coupling mechanism of claim 1, wherein the outer flange includes a substantially sinusoidal shape.

11. A coupling mechanism for connecting together a plurality of pipes, the coupling mechanism comprising:
- a connection section including a first opening, an inner flange, and an outer flange, wherein a recessed section is defined between the inner flange and the outer flange and surrounds the entire first opening, wherein the connection section is configured to connect to a first pipe;
- a sleeve portion including a second opening and configured to connect to a second pipe, wherein the inner flange and the outer flange of the connection section extend from the sleeve portion at an angle,
- wherein the outer flange has a substantially continuous innermost surface for mating with an exterior surface of the first pipe and the inner flange has a substantially continuous outermost surface for mating with an interior surface of the first pipe;
- wherein the recessed section is angularly tapered from the inner flange to the outer flange with respect to the innermost surface and outermost surface;
- wherein the outer flange has an outermost circumferential edge having a diameter that changes along the circumference of the outermost circumferential edge, wherein the outermost circumferential edge has a first section positioned opposite a second section and a third section positioned opposite a fourth section, the third and fourth sections positioned transverse to the first and second sections and connecting the first and second sections, wherein the first section has a radius larger than a radius of the second section, and the third and fourth sections have substantially the same radii, and the third and fourth sections have different radii than the first and second sections;
- wherein the inner flange has an outermost circumferential edge having a diameter that changes along the circumference of the outermost circumferential edge, wherein the entire diameter of the outermost circumferential edge of the inner flange is smaller than the entire diameter of the outermost circumferential edge of the outer flange;
- wherein the outermost circumferential edge of the inner flange has a first section positioned opposite a second section and a third section positioned opposite a fourth section, the third and fourth sections positioned transverse to the first and second sections and connecting the first and second sections, wherein the first section has a radius larger than a radius of the second section, and the third and fourth sections have substantially the same radii, and the third and fourth sections have different radii than the first and second sections;
- wherein the first section of the inner flange includes a thickness larger than a thickness of the second section of the inner flange;
- wherein the thickness is measured transverse to the radius;
- a channel extending through the coupling mechanism between the first opening and the second opening; and
- one or more ribs extending between the outer flange and the sleeve portion.

12. The coupling mechanism of claim 11, wherein the one or more ribs are positioned around an outer circumference of the sleeve portion.

13. A coupling mechanism for connecting together a plurality of pipes, the coupling mechanism comprising:
- a connection section including a first opening having a central axis, an inner flange, and an outer flange, wherein a recessed section is defined between the inner flange and the outer flange and surrounds the entire first opening, wherein the connection section is configured to connect to a first pipe;
- a sleeve portion including a second opening and configured to connect to a second pipe; and
- a channel extending through the coupling mechanism between the first opening and the second opening, wherein the first opening is angled relative to the second opening,
- wherein the outer flange has a substantially continuous innermost surface for mating with an exterior surface of the first pipe and the inner flange has a substantially continuous outermost surface for mating with an interior surface of the first pipe;
- wherein the recessed section is angularly tapered from the inner flange to the outer flange with respect to the innermost surface and outermost surface;
- wherein the outer flange has an outermost circumferential edge having a diameter that changes along the circumference of the outermost circumferential edge, wherein the outermost circumferential edge has a first section positioned opposite a second section and a third section positioned opposite a fourth section, the third and fourth sections positioned transverse to the first and second sections and connecting the first and second sections, wherein the first section has a radius larger than a radius of the second section, and the third and fourth sections have substantially the same radii, and the third and fourth sections have different radii than the first and second sections;
- wherein the inner flange has an outermost circumferential edge having a diameter that changes along the circumference of the outermost circumferential edge, wherein the entire diameter of the outermost circumferential edge of the inner flange is smaller than the entire diameter of the outermost circumferential edge of the outer flange;
- wherein the outermost circumferential edge of the inner flange has a first section positioned opposite a second section and a third section positioned opposite a fourth section, the third and fourth sections positioned transverse to the first and second sections and connecting the first and second sections, wherein the first section has a radius larger than a radius of the second section, and the third and fourth sections have substantially the same radii, and the third and fourth sections have different radii than the first and second sections;
- wherein the first section of the inner flange includes a thickness larger than a thickness of the second section of the inner flange;
- wherein the radius of the outermost circumferential edge of the inner flange and the radius of the outermost circumferential edge of the outer flange are measured radially along the surface of the flange; and
- wherein the thickness is measured transverse to the radius.

14. The coupling mechanism of claim 13, wherein the outer flange surrounds an outer periphery of the inner flange.

15. The coupling mechanism of claim 13, wherein a recessed section is defined between the inner flange and the outer flange, and wherein the inner flange and the outer flange are configured to secure a wall of the first pipe within the recessed section.

* * * * *